US007245756B2

(12) United States Patent
Inoue et al.

(10) Patent No.: US 7,245,756 B2
(45) Date of Patent: Jul. 17, 2007

(54) LIQUID EJECTION INSPECTING METHOD, LIQUID EJECTION INSPECTOR, AND IMAGE FORMING APPARATUS

(75) Inventors: Hiroshi Inoue, Kanagawa (JP); Yukio Sugita, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 673 days.

(21) Appl. No.: 10/457,395

(22) Filed: Jun. 10, 2003

(65) Prior Publication Data

US 2003/0228046 A1 Dec. 11, 2003

(30) Foreign Application Priority Data

Jun. 11, 2002 (JP) ............................ 2002-170349

(51) Int. Cl.
*G06K 9/00* (2006.01)

(52) U.S. Cl. ........................ 382/141; 382/112; 347/68; 358/502

(58) Field of Classification Search ................ 382/103, 382/106, 112, 113, 116, 140, 149, 152, 162, 382/168, 175, 181, 199, 254, 274–276, 305, 382/318; 347/57, 68, 15, 65, 23, 19; 358/502, 358/505
See application file for complete search history.

(56) References Cited

U.S. PATENT DOCUMENTS 6,431,685 B1 * 8/2002 Misumi ....................... 347/57
6,460,980 B1 * 10/2002 Hegedus et al. .............. 347/68
6,471,323 B2 * 10/2002 Shibata et al. ................ 347/15
6,547,367 B1 4/2003 Hamada
6,557,984 B2 * 5/2003 Tanaka et al. ................ 347/65
6,672,704 B2 * 1/2004 Katakura et al. ............. 347/23
6,702,419 B2 * 3/2004 Stoessel et al. ............... 347/19
6,764,159 B2 * 7/2004 Endo ........................... 347/19

FOREIGN PATENT DOCUMENTS

JP 8-332736 A 12/1996
JP 11-078051 A 3/1999
JP 11-192726 A 7/1999
JP 2001-063083 A 3/2001

* cited by examiner

*Primary Examiner*—Seyed Azarian
(74) *Attorney, Agent, or Firm*—Sughrue Mion, PLLC

(57) ABSTRACT

A printhead of an ink jet printer includes plural ejection nozzles for ejecting ink. In an ink ejection inspecting method for the printhead, the ejection nozzles are photographed in the printhead, to output image data. The image data is analyzed by the pattern recognition, to output analysis result information. According to this, it is judged whether an ejecting state of the ejection nozzles is acceptable or unacceptable.

27 Claims, 7 Drawing Sheets

LIQUID EJECTION INSPECTING METHOD, LIQUID EJECTION INSPECTOR, AND IMAGE FORMING APPARATUS

BACKGROUND OF THE INVENTION

1. Field of the Invention

The present invention relates to a liquid ejection inspecting method, liquid ejection inspector and image forming apparatus. More particularly, the present invention relates to a liquid ejection inspecting method and liquid ejection inspector in which inspection of liquid ejection to check failure can be effected efficiently without waste of consumables, and an image forming apparatus for use with the liquid.

2. Description Related to the Prior Art

An ink jet printer is known as an image forming apparatus. A printhead includes an ink reservoir for storing ink. Ejection nozzles are connected with the ink reservoir, and caused by an ink supply unit to eject the ink to print an image on a recording medium. The ink jet printer of the type known so far has problems in that ink is dried and deposited on the inside of the ejection nozzles, or that the surplus ink may be scattered by the recording medium, and come back to and deposit on a surface of the printhead, to cause jamming of ink.

When jamming of ink occurs, there is ejection failure in which an amount of ejected ink decreases, or comes down to zero. Unevenness in the density or colors occurs in a streak shape in a recorded image, to lower the image quality remarkably. Therefore, it is necessary in an ink jet printer to detect the ejection failure at the ejection nozzles, and to eliminate the ejection failure in the case of occurrence.

To check the ejection failure, various methods are known. JP-A 8-332736 and 11-078051 disclose test printing to eject test ink to the recording medium and inspection of the shape and arrangement of droplets of the ink. JP-A 11-192726, EP-A 1059172 (corresponding to JP-A 2001-054954), and JP-A 2001-063083 disclose methods in which droplets of test ink are ejected, a beam of laser or other electromagnetic rays is applied to the droplets, to detect a shielded state of the beam at the droplets.

However, those known techniques have problems. In the first of those methods, a test pattern must be recorded together with a target image without any relation. Also, ink for test printing is required in a wasteful manner. A space in the recording medium for receiving droplets of the ink is required for the test printing. In the second of those methods, the same problem occurs in ink for test printing is required in a wasteful manner. Specifically, density in image recording has been higher in recent techniques for printing. The number of the ejection nozzles as arranged in the printhead has been high. This causes a shortcoming in requirement of much time for the detecting the ejection failure. If the ejection failure is checked in the course of the printing, productivity or efficiency in the printing becomes lower.

SUMMARY OF THE INVENTION

In view of the foregoing problems, an object of the present invention is to provide a liquid ejection inspecting method and liquid ejection inspector in which inspection of liquid ejection to check failure can be effected rapidly and efficiently without waste of consumables, and an image forming apparatus for use with the liquid.

In order to achieve the above and other objects and advantages of this invention, a liquid ejection inspecting method is provided for an ejection nozzle array including plural ejection nozzles for ejecting liquid. In the liquid ejection inspecting method, the ejection nozzles are photographed in the ejection nozzle array, to output image data. The image data is analyzed to output analysis result information. It is judged whether an ejecting state of the ejection nozzles is acceptable or unacceptable according to the analysis result information.

In the analyzing step, predetermined reference image data is used, to check the image data by comparison.

Furthermore, if the ejection nozzles are in the unacceptable state, the ejection nozzles are wiped to eliminate foreign material.

The photographing, analyzing, and judging steps are effected again after the eliminating step. Furthermore, if the unacceptable state is judged again in the judging step, an alarm signal is generated.

According to another aspect of the invention, an image forming apparatus comprises at least one ejection nozzle array including plural ejection nozzles for ejecting liquid. A pickup device photographs the ejection nozzles in the ejection nozzle array, to output image data. An analyzer stores reference image data, and outputs analysis result information according to the image data and the reference image data. A determining unit judges whether an ejecting state of the ejection nozzles is acceptable or unacceptable according to the analysis result information.

Furthermore, a foreign material elimination unit eliminates foreign material from the ejection nozzles.

The reference image data is used in a pattern recognition process, and the analyzer and the determining unit cooperate to judge one of acceptable and unacceptable states of the ejection nozzles by evaluating the image data in the pattern recognition process.

The elimination unit is operated at least when the unacceptable state is judged according to the analysis result information.

According to the analysis result information, the elimination unit is selectively operated for unacceptable ejection nozzles included in the ejection nozzles and of which the unacceptable state is judged.

The analyzer further calculates a blocked area where the foreign material blocks the ejection nozzles according to the image data. Furthermore, a control unit changes a driving parameter of the elimination unit according to the blocked area.

The elimination unit is a suction unit for sucking the liquid out of the ejection nozzles, and the driving parameter is at least one of a pressure of suction of the suction unit, a length of time of the suction, and a number of times of the suction.

The liquid is ink, and the ejection nozzle array constitutes a printhead of an ink jet type, is adapted to image recording to recording material, and extends in a first scan direction. Furthermore, a control unit moves one of the printhead and the recording material relative to a remaining one thereof at a small adjusting shifted amount in the first scan direction, the adjusting shifted amount being equal to a pitch between an unacceptable nozzle of which the unacceptable state is judged and an acceptable nozzle close thereto and of which the acceptable state is judged among the ejection nozzles, the control unit causing the acceptable nozzle to eject the ink instead of the unacceptable nozzle, so as to compensate for lowering of image quality due to the unacceptable state.

Furthermore, a mode selector sets a selected one of an elimination mode and a nozzle substitution mode, and when the elimination mode is set, operates the elimination unit, and when the nozzle substitution mode is set, causes the control unit to operate the acceptable nozzle included in the ejection nozzles for substitution.

Furthermore, a carriage moves the printhead relative to the recording material in a second scan direction. The pickup device is arranged beside a printing surface of the recording material in the second scan direction, and is opposed to the printhead moved by the carriage.

Furthermore, an image history memory stores image history data constituted by plural sets of image data obtained previously. The analyzer judges whether the image data is within a range of the image history data, and if the image data is within the range of the image history data, determines the acceptable state of an ejection nozzle corresponding to the image data, and if the image data is outside the range of the image history data, determines an ejection nozzle corresponding to the image data as a failure-expected nozzle, and processes the image data for the failure-expected nozzle, to output the analysis result information.

The pickup device photographs the failure-expected nozzle when operated again.

The analyzer determines a difference between the image data and the reference image data, the difference constituting the analysis result information. The determining unit stores information of a predetermined threshold value adapted to the pattern recognition process, compares the difference with the threshold value, judges the acceptable state if the difference is equal to or less than the threshold value, and judges the unacceptable state if the difference is more than the threshold value.

The pickup device comprises a CCD or CMOS.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENT(S) OF THE PRESENT INVENTION

Figure 1:
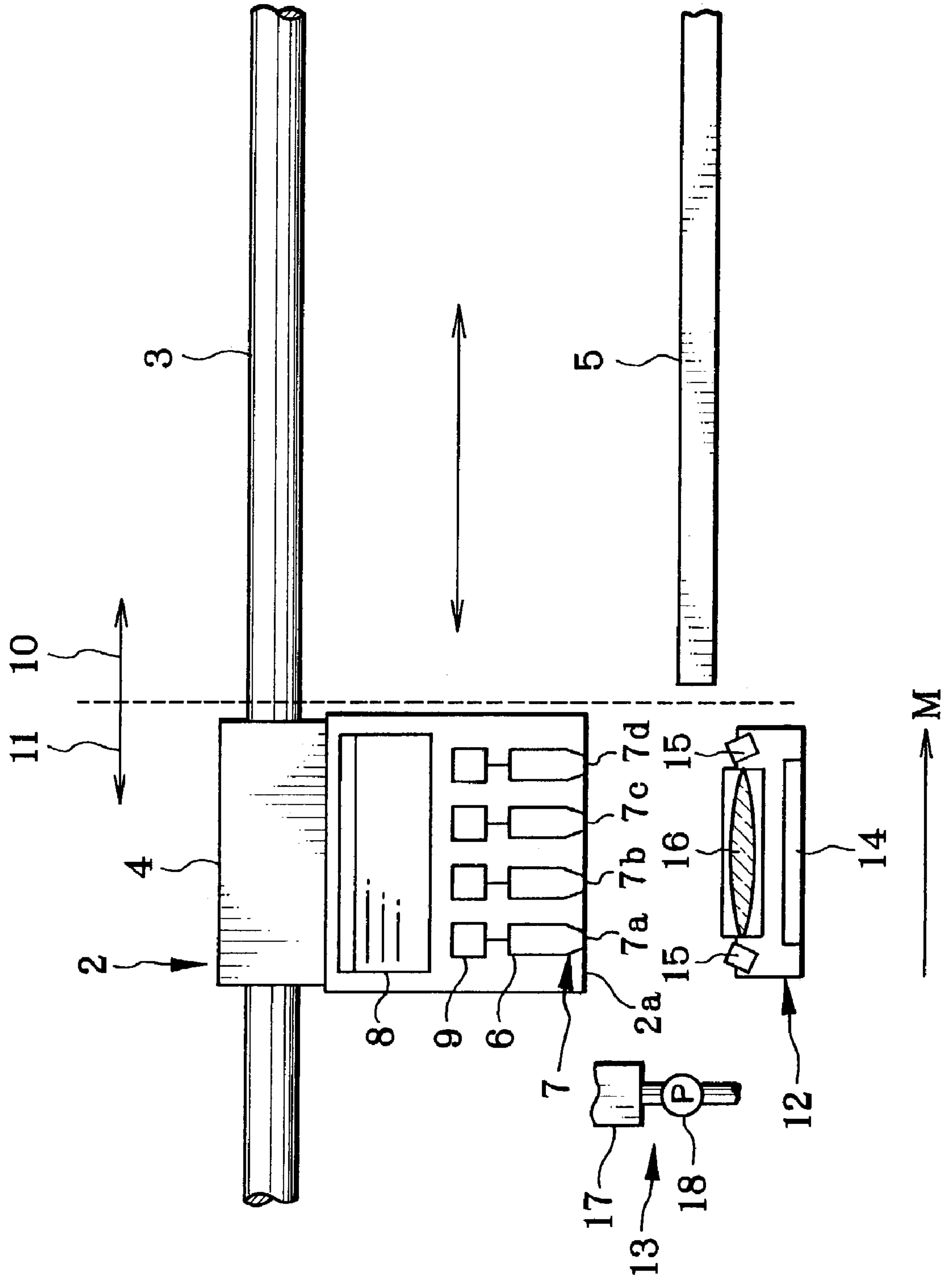
FIG. 1 is an explanatory view illustrating important portions in an ink jet printer at a printhead.

In FIG. 1, an ink jet type of printhead 2 as ejection nozzle array is illustrated as an element for an ink jet printer or image forming apparatus. A carriage 4 supports the printhead 2. There is a guide rod 3 which extends in a main scan direction M and is inserted through a hole of the carriage 4. The carriage 4 slides the printhead 2 back and forth in the main scan direction M of the arrows. A feed roller (not shown) intermittently feeds the recording material 5 of paper in a sub scan direction S, for image recording of the printhead 2 to the recording material 5 according to the ink jet printing. For the sub scan direction S, see FIG. 2.

The printhead 2 has a nozzle arrangement surface 2*a* opposed to the recording material 5. A plurality of ejection nozzles 7 are arranged in the printhead 2. An ink chamber 6 is connected to each of the ejection nozzles 7. An ink reservoir 8 stores ink. A passageway is connected with the ink reservoir 8, and passes the ink to the ink chamber 6. An ink supply unit 9 is used to supply the ejection nozzles 7 with the ink from the ink reservoir 8, and fires the ejection nozzles 7 to record an image on the recording material by ejection of the ink.

Examples of the recording material 5 include printing paper, resin film such as an OHP (overhead projector) sheet, fabric, a surface of a product of metal, and the like. If the printer is a piezoelectric printing type, the ink supply unit 9 is a piezoelectric element for pressurizing the ejection nozzles 7. If the printer is a bubble jet printing type, the ink supply unit 9 is a heater for generating bubbles by heating ink in the ejection nozzles 7.

Figure 2:
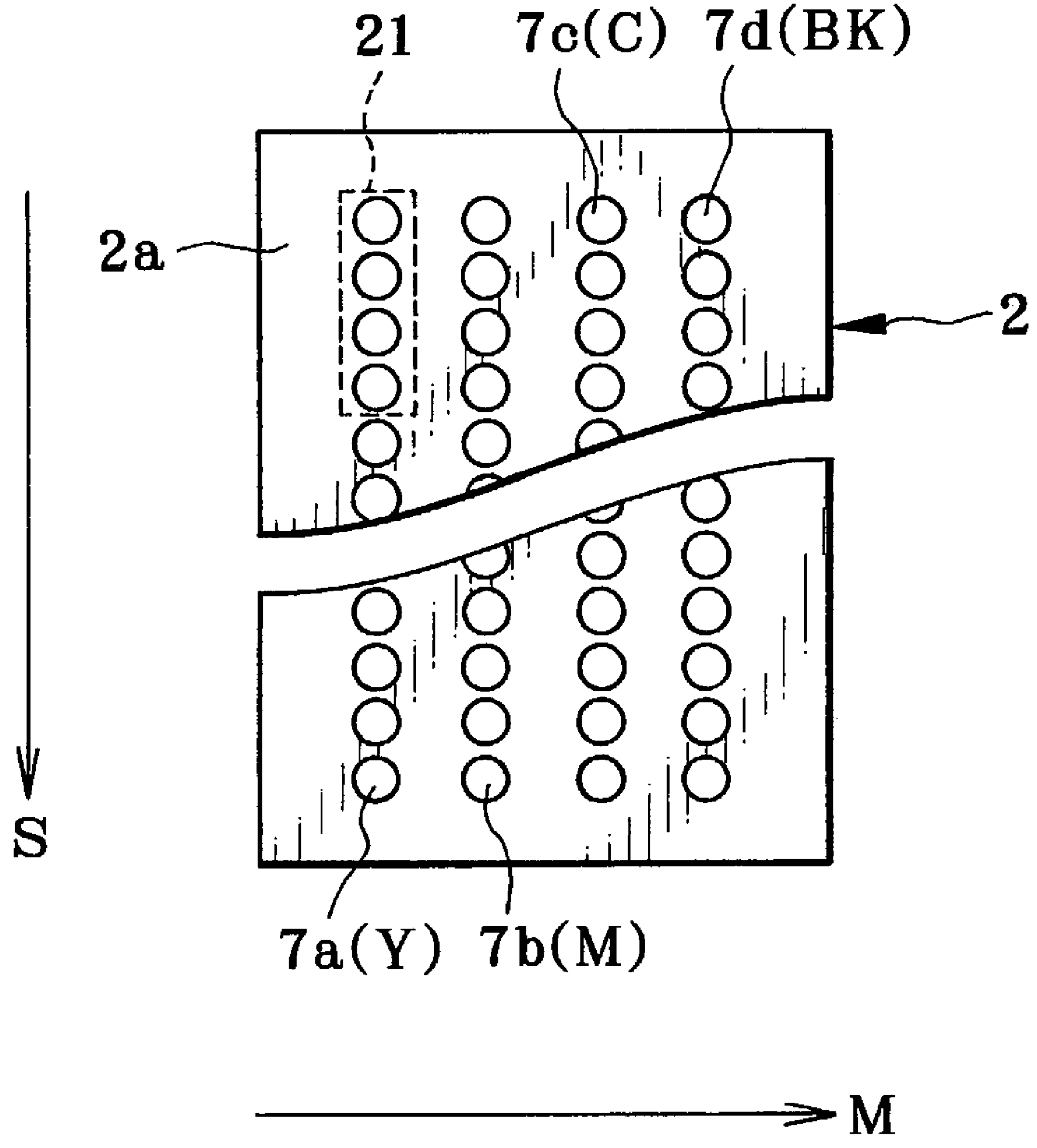
FIG. 2 is a plan illustrating arrangement of ejection nozzles.

In FIG. 2, the nozzle arrangement surface 2*a* of the printhead 2 includes four arrays of nozzles which are yellow ink ejection nozzles 7*a*, magenta ink ejection nozzles 7*b*, cyan ink ejection nozzles 7*c* and black ink ejection nozzles 7*d*. Each of the nozzle arrays extends in the sub scan direction S. Note that it is possible to add nozzle arrays for ink of other colors, such as a dark yellow, a light magenta and a light cyan.

At the time of printing, a drive signal according to image data of an image is supplied to the ink supply unit 9 for each of the colors. Ink droplets of the number and sizes according to the image data are ejected toward the recording material 5. A full-color image is obtained by arrangement of the ink droplets on the recording material 5.

In FIG. 1, a moving path of the printhead 2 includes two portions, which are a printing region 10 and a marginal region 11. The printing region 10 is where the recording material 5 is subjected to image recording. The marginal region 11 is beside the printing region 10 and is not used for image recording. There are a pickup device 12 and a suction unit 13 in the marginal region 11. The pickup device 12 includes a pickup element 14, a light source 15 and a pickup optical system 16. The pickup element 14 is an image sensor, for example an area CCD (charge coupled device) sensor for photographing the printhead 2. The light source 15 applies light to the nozzle arrangement surface 2*a*. The pickup optical system 16 includes a condenser lens, an enlarging lens and the like. The condenser lens focuses light upon the pickup element 14 upon reflection of the light from the nozzle arrangement surface 2*a*. The enlarging lens enlarges an image of the vicinity of the ejection nozzles 7.

The pickup device 12 is constructed in a selectable manner between a normal pickup mode and a high image quality mode. When the normal pickup mode is set, the pickup device 12 picks up four nozzles among the ejection nozzles 7 and disposed inside a pickup region 21 at the broken line in FIG. 2. When the high image quality mode is set, each of the ejection nozzles 7 with its vicinity is picked up in enlargement by use of an enlarging lens in the pickup optical system 16. The image data obtained by picking up is transferred to an analyzer 32 which will be described later.

As the pickup device 12 is located in the marginal region 11, it is possible to photograph an image at any time irrespective of printing and not printing. The printing can be discontinued immediately upon detection of the failure in the ink ejection. Wasteful use of the ink can be suppressed specifically when a size of image data of an image is considerably great. Note that, in spite of the four nozzles photographed simultaneously in the present embodiment, it is possible to photograph three or less or five or more nozzles at one time. This is because the number of the photographable nozzles changes according to definition of the pickup device 12 and the density of arranging the nozzles. Also, the pickup element 14 may be a line CCD sensor instead of the area CCD sensor. For the line CCD sensor, it is necessary to synchronize the operation of the sensor with the movement of the carriage 4.

There is a determining unit 33 for detecting failing ones of the nozzles as will be described later. The suction unit 13 operates for recovery of a normal state by eliminating failure in the ink ejection. The suction unit 13 includes a suction cap or head 17 and a suction pump 18. At the time of the recovering process, the suction cap 17 is tightly contacted on the nozzle arrangement surface 2*a*. The suction pump 18 is driven to suck the ink from out of the ejection nozzles 7. It is to be noted that the suction cap 17 may be separate from a protecting cap (not shown) which covers the nozzle arrangement surface 2*a* at the time of not printing. According to this, wasteful use of the ink can be reduced, because only a failing one of the ejection nozzles 7 with the jam of ink can be sucked selectively by use of the suction cap 17.

Figure 3:
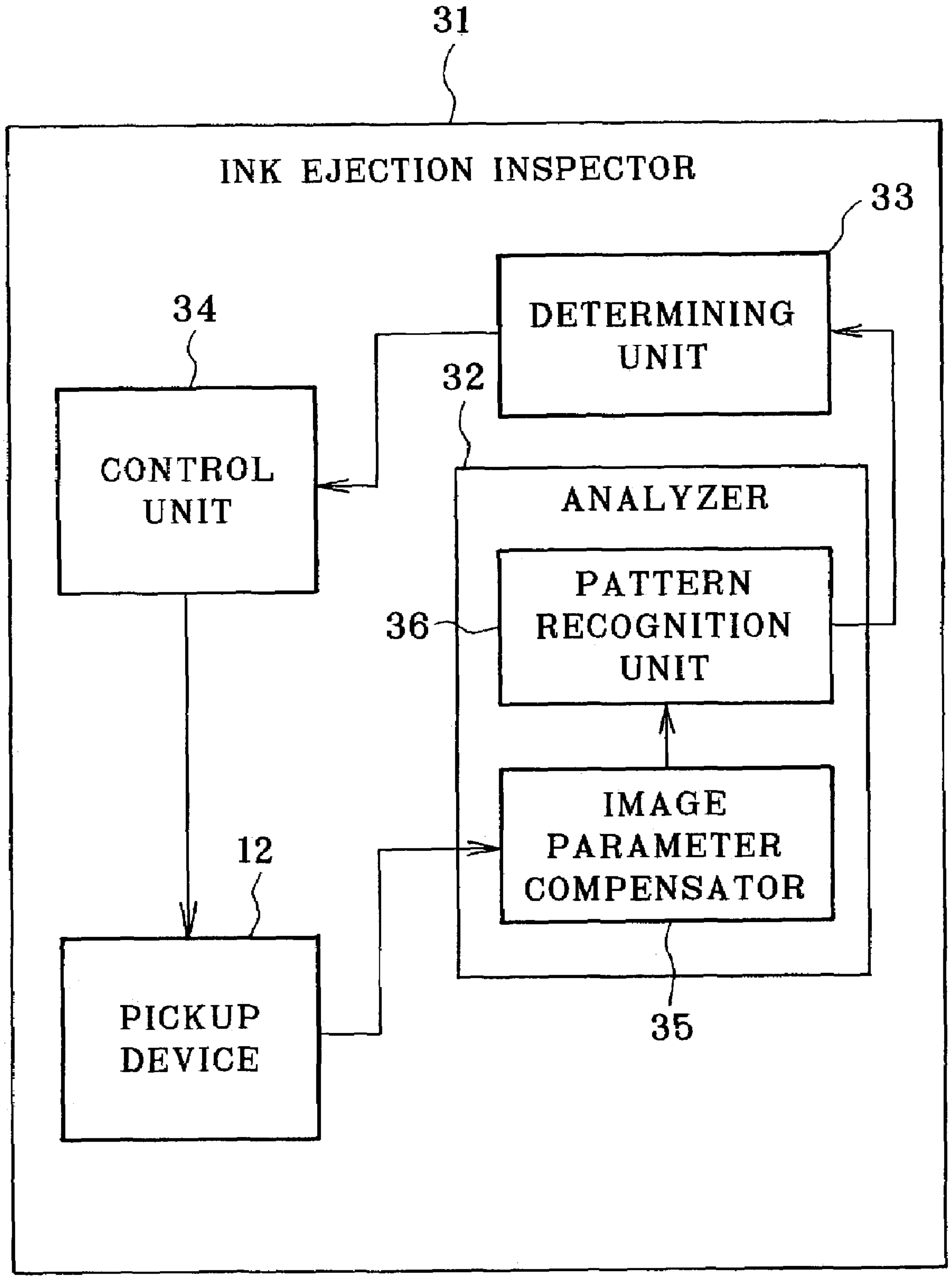
FIG. 3 is a block diagram schematically illustrating an ink ejection inspector.

In FIG. 3, an ink ejection inspector 31 of the invention is schematically illustrated. The ink ejection inspector 31 has the pickup device 12, and also includes the analyzer 32, the determining unit 33 and a control unit 34. The analyzer 32 analyzes the image data transferred from the pickup device 12. The determining unit 33 is constituted by a threshold value memory, and judges existence of failure or lack according to the analysis result. The control unit 34 controls the pickup device 12 and the suction unit 13 at the time of recovery operation.

The analyzer 32 includes an image parameter compensator 35 and a pattern recognition unit 36. The image parameter compensator 35 subjects the image data to edge enhancement or other correction after the transfer from the pickup device 12. The pattern recognition unit 36 operates according to the known technique of the pattern recognition, and recognizes the image data after the correction.

Figure 4A:
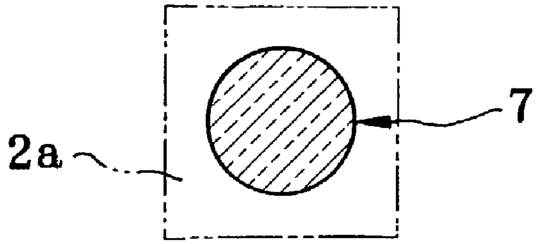
FIG. 4A is an explanatory view in plan, illustrating an ejection nozzle in a clean state.
Figure 4B:
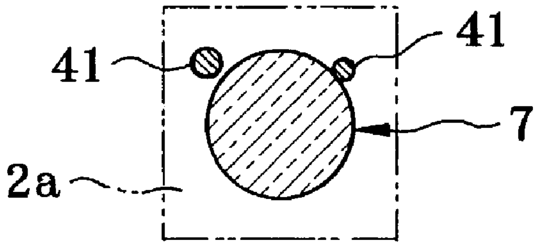
FIG. 4B is an explanatory view in plan, illustrating an ejection nozzle with foreign material thereabout.
Figure 4C:
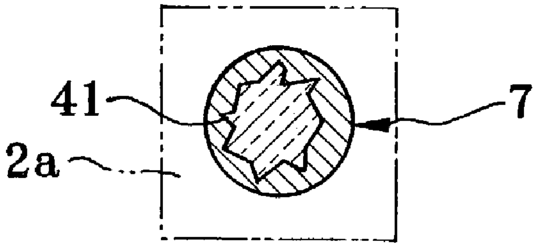
FIG. 4C is an explanatory view in plan, illustrating an ejection nozzle with foreign material on its edge.
Figure 4D:
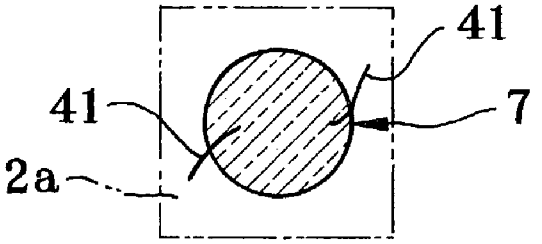
FIG. 4D is an explanatory view in plan, illustrating an ejection nozzle with foreign material having a small width.
Figure 4E:
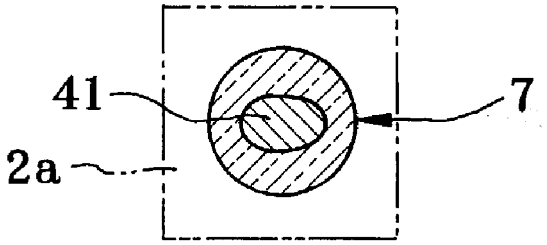
FIG. 4E is an explanatory view in plan, illustrating an ejection nozzle with foreign material at the nozzle center.
Figure 4F:
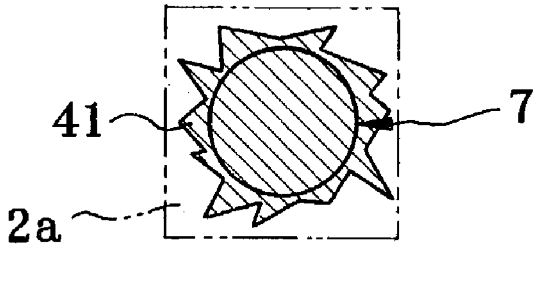
FIG. 4F is an explanatory view in plan, illustrating an ejection nozzle with foreign material covering the whole of the nozzle.

The pattern recognition unit 36 is constituted by a reference image memory, and checks the image data from the pickup device 12 by comparison with reference image data stored previously. In FIG. 4A, a normal state of the ejection nozzles 7 is illustrated, of which an image constitutes the reference image data. In FIGS. 4B-4F, various states of failures of the ejection nozzles 7 are illustrated, which are clearly distinct from the normal state represented by the reference image data. In FIG. 4B, foreign material 41, such as extra ink, dust or other unwanted particle, is stuck on the nozzle arrangement surface 2*a* near to the ejection nozzles 7. In FIG. 4C, the foreign material 41 is stuck to the inner surface of the ejection nozzles 7. In FIG. 4D, the foreign material 41 line-shaped with a small width is stuck and extends across one edge of the ejection nozzles 7. In FIG. 4E, the foreign material 41 is located inside the ejection nozzles 7 or the ink chamber 6. In FIG. 4F, the foreign material 41 is stuck to cover the whole of the ejection nozzles 7. It is to be noted that finite differences may be used for the purpose of the pattern recognition. A finite difference between the reference image data and the image data of the picking up is determined. If the finite difference is more than a threshold value, then failure in the ejection is determined in the determining unit 33.

The failing nozzles among the ejection nozzles 7 according to the determination in the determining unit 33 are subjected to the recovering process which includes steps of sucking the ink in the suction unit 13, forcible ejection, heating the periphery of each nozzle, wiping with a blade of a wiper, and the like. In the case of the failure depicted in FIG. 4B, the ejection of the ink is safe. However, a problem is likely to occur because an ejecting direction toward the recording material 5 may change. The wiping blade in the wiper is used for wiping the nozzle arrangement surface 2*a* to eliminate the foreign material 41. For the failure of this kind, only the wiping can be used for the recovery. The suction of the ink and other steps are not required. Thus, the failure in the ink ejection can be overcome at a short time without wasting the ink.

In the case of failure of each of FIGS. 4C and 4E, the foreign material 41 exists in the ejection nozzles 7. Then suction of the ink is effected to eliminate the foreign material 41. To this end, the pattern recognition unit 36 calculates an area of a region at which the foreign material 41 closes the ejection nozzles 7, and adjusts at least one of the suction pressure, the length of suction time, and the number of times of the suction in the suction unit 13 according to the greatness of the calculated area. This is very effective in the recovering process at a high efficiency.

In the case of failure of each of FIGS. 4D and 4F, the nozzle is wiped by the blade in the same manner as FIG. 4B, to eliminate the foreign material 41. At this time, the suction with the suction unit 13 can be additionally used if required. After the recovering process, it happens that failure in the ejection is detected again. For this case, the operation for the recovering process is effected for a second time. Otherwise, an alarm unit is driven to generate an alarm signal in a visible or audible manner, to inform a user of the abnormal state. If the printing has been started even at the time of the alarm signal, the printing is immediately interrupted in a forcible manner. It is desirable to avoid a wasteful use of the ink.

Figure 5:
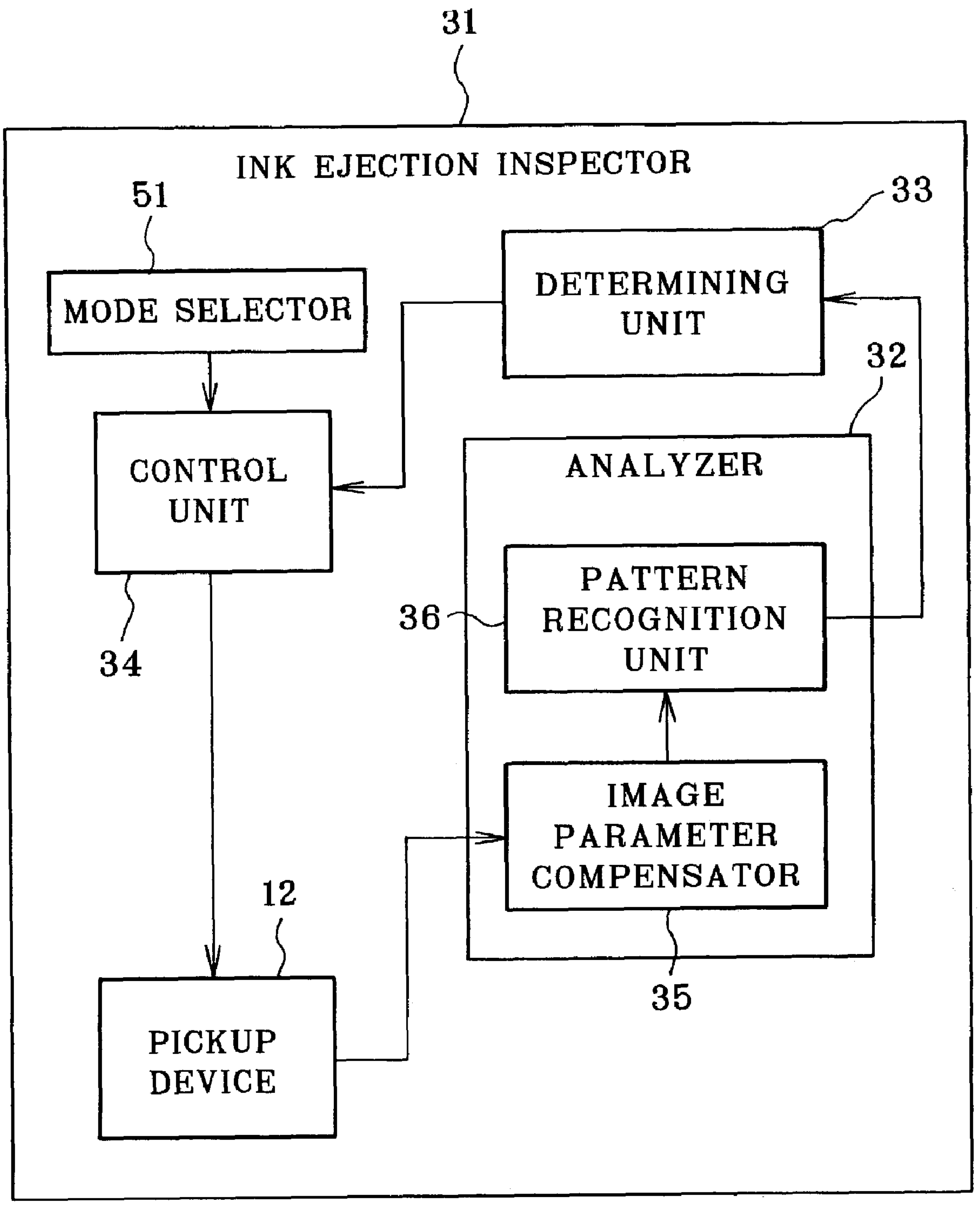
FIG. 5 is a block diagram schematically illustrating another preferred embodiment including a selector.

Furthermore, if one or more of the ejection nozzles 7 have failure, remaining normal nozzles 7 can be substituted for the failing nozzles. The feeding speed of the recording material 5 can be lowered in the printing. After the printing at the low speed is completed, the recovering operation may be effected. In FIG. 5, one preferred embodiment is illustrated, in which a mode selector 51 is added. The mode selector 51 is operable by manual operation of a user, and sets a selected one of a mode of effecting the suction and a mode for the substitution with the normal nozzles.

Figure 6:
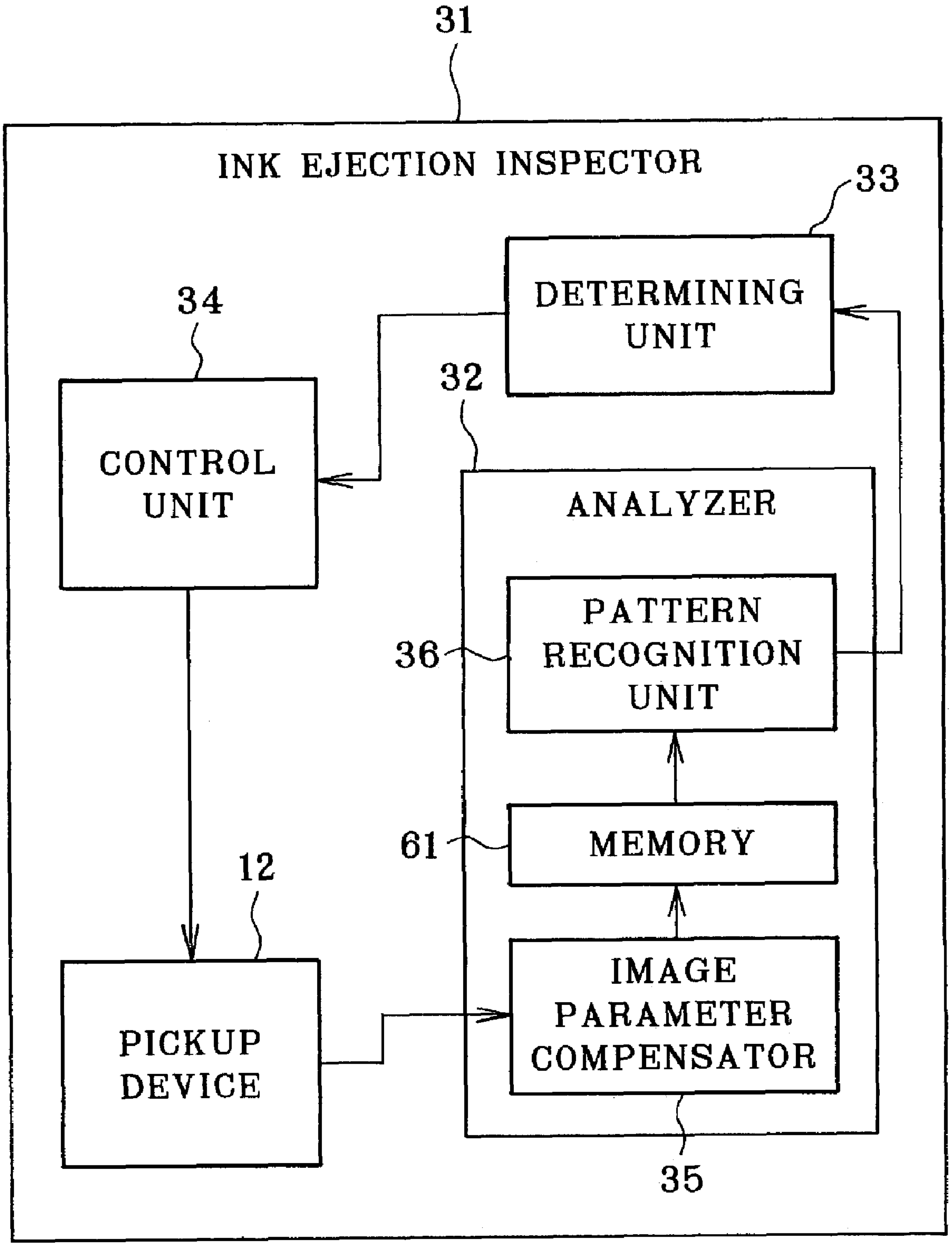
FIG. 6 is a block diagram schematically illustrating one preferred embodiment including a memory.

In FIG. 6, another preferred embodiment is illustrated, in which an image history memory 61 is included in the analyzer 32 for storing image data as numerous sets of image history data obtained by the pickup device 12. The analyzer 32 accesses the image history memory 61, compares the image data with the stored image data as image history data, and produces information of expecting nozzles which are likely to have future failure. After determining those failure-expected nozzles, the failure-expected nozzles are subjected with priority to the inspection of the acceptability. Otherwise, only the failure-expected nozzles are subjected to the inspection without inspecting the remainder. This is advantageous in shortening the total time required for the inspection of the failure. Note that the precision in the inspection can be raised by vibrating a meniscus as a surface of the ink droplet at the ejection nozzles 7 in the ink supply unit 9.

Note that the pickup element 14 may be a CMOS (complementary metal-oxide semiconductor) sensor instead of the CCD sensor. Also, it is possible to apply laser light to the ejection nozzles 7, and obtain surface shape data of protruding and retracting shapes. The surface shape data can be checked by comparison with predetermined reference surface shape data, so as to detect failure in the ejection. Also, an ink jet printer of the invention may be a piezoelectric printing type. A pressurizing pump is provided in an ink supply passageway between the ink reservoir 8 and the printhead 2. At the time of the process for the recovery, the pressurizing pump is actuated to raise an inner pressure of the ink supply passageway. Piezoelectric elements are driven to eliminate foreign material by ejecting the ink. Otherwise, it is possible to eject the ink forcibly by raising amplitude of the voltage applied to the piezoelectric elements for the purpose of eliminating foreign material.

Figure 7:
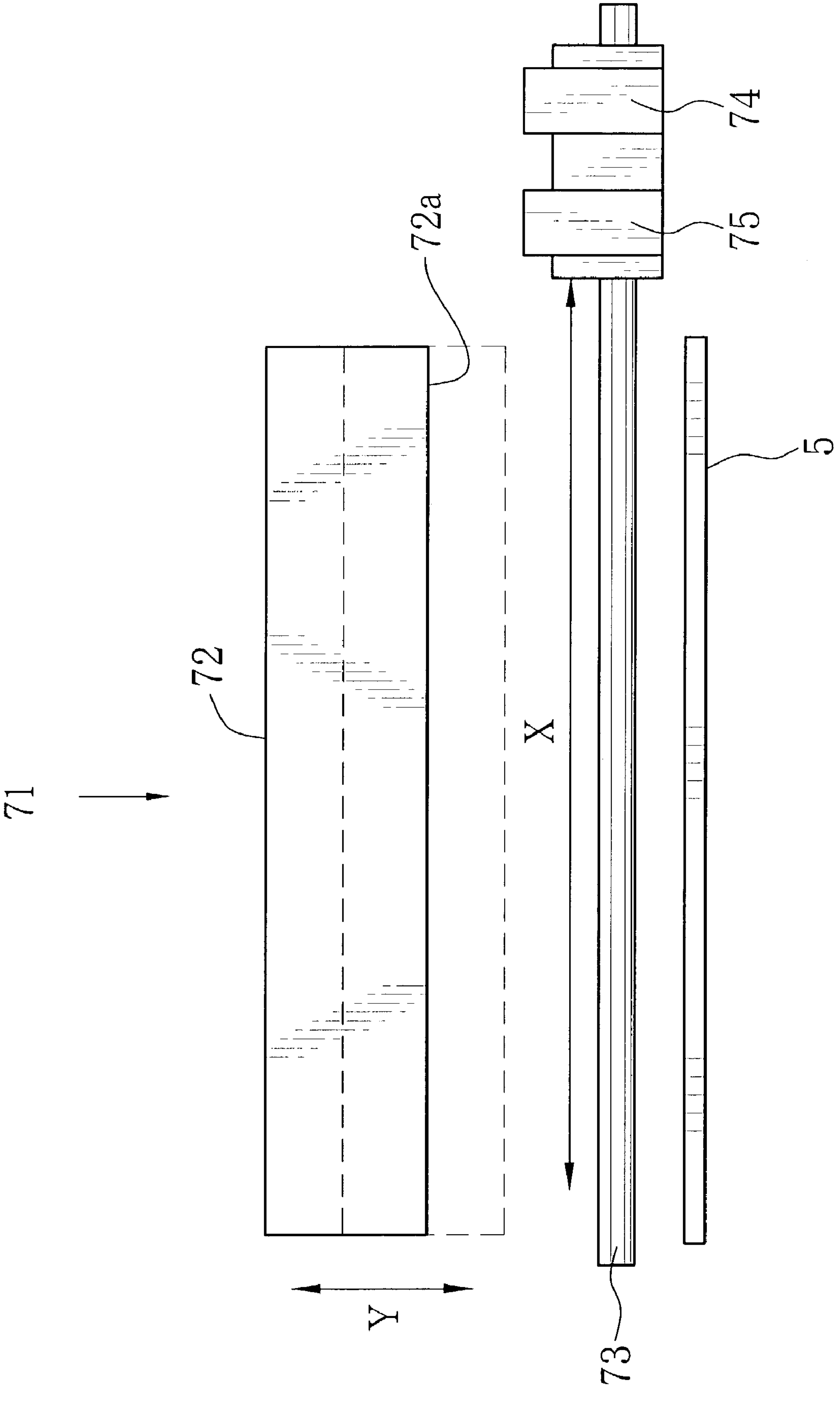
FIG. 7 is an explanatory view illustrating a line printer for ink jet printing according to the invention.

In the above embodiment, the printer is a serial printer. However, a printer according to the invention may be a line printer 71 of FIG. 7 which includes a printhead of a great length. The recording material 5 in the line printer 71 is fed in a direction perpendicular to a surface of the drawing sheet. An ink jet type of printhead 72 as ejection nozzle array records an image to the recording material 5. The printhead 72 is stationary during the printing operation, but is shiftable away in a direction Y indicated by the arrow and perpendicular to feeding of the recording material 5.

A guide rod 73 is disposed between the printhead 72 and the recording material 5. A pickup device 74 and a suction unit 75 are supported on the guide rod 73 in a slidable manner in a direction X indicated by the arrow. The suction unit 75 is movable up and down in the direction Y. A nozzle arrangement surface 72*a* of the printhead 72 is contacted tightly by the suction unit 75, which subjects failing nozzles to the recovering process among the ejection nozzles 7. To detect failure in the ink ejection, the printhead 72 is shifted away so as to slide the pickup device 74 and the suction unit 75 along the guide rod 73. Note that it is possible to shift away a passageway for the recording material 5 instead of shifting the printhead 72.

Also, the liquid ejected according to the present invention may be other than the ink.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A liquid ejection inspecting method for an ejection nozzle array including plural ejection nozzles comprising a printhead for ejecting liquid wherein said plural ejection nozzles extend in a first scan direction, said liquid ejection inspecting method comprising the steps of:

photographing said ejection nozzles in said ejection nozzle array, to output image data;

analyzing said image data to output analysis result information;

judging whether an ejecting state of said ejection nozzles is acceptable or unacceptable according to said analysis result information;

moving one of said printhead and said recording material relative to a remaining one thereof at a small adjusting shifted amount in said first scan direction, said adjusting shifted amount being equal to a pitch between an unacceptable nozzle of which said unacceptable state is judged and an acceptable nozzle close thereto and of which said acceptable state is judged among said ejection nozzles, and causing said acceptable nozzle to eject said ink instead of said unacceptable nozzle, so as to compensate for lowering of image quality due to said unacceptable state; and recording images to recording material based on whether an object which prevents said liquid from passing through a discharging port of said ejection nozzle is stuck on said ejection nozzle.

2. A liquid ejection inspecting method as defined in claim 1, wherein in said analyzing step, predetermined reference image data is used, to check said image data by comparison.

3. A liquid ejection inspecting method as defined in claim 2, wherein said reference image data is used in a pattern recognition process, and one of acceptable and unacceptable states of said ejection nozzles is judged by evaluating said image data in said pattern recognition process.

4. A liquid ejection inspecting method as defined in claim 3, further comprising a step of, if said ejection nozzles are in said unacceptable state, wiping said ejection nozzles to eliminate foreign material.

5. A liquid ejection inspecting method as defined in claim 3, further comprising a step of, if said ejection nozzles are in said unacceptable state, eliminating foreign material from said ejection nozzles.

6. A liquid ejection inspecting method as defined in claim 5, wherein said photographing, analyzing, and judging steps are effected again after said eliminating step;

further comprising a step of, if said unacceptable state is judged again in said judging step, generating an alarm signal.

7. A liquid ejection inspecting method as defined in claim 3, wherein said analyzing step includes determining a difference between said image data and said reference image data, said difference constituting said analysis result information;

said judging step includes comparing said difference with a predetermined threshold value adapted to said pattern recognition process, judging said acceptable state if said difference is equal to or less than said threshold value, and judging said unacceptable state if said difference is more than said threshold value.

8. A liquid ejection inspecting method as defined in claim 3, wherein said liquid is ink, and said ejection nozzle array constitutes a printhead of an ink jet type.

9. The liquid ejection inspecting method of claim 1, wherein the photographing said ejection nozzles further comprises photographing ejection nozzle orifices.

10. A liquid ejection inspector for an ejection nozzle array including plural ejection nozzles comprising a printhead for ejecting liquid wherein said ejection nozzle array extends in a first scan direction, said liquid election inspector comprising:

a pickup device for photographing said ejection nozzles in said ejection nozzle array, to output image data, wherein said image data is recorded to recording material;

an analyzer for storing reference image data, and for outputting analysis result information according to said image data and said reference image data;

a determining unit for judging whether an ejecting state of said ejection nozzles is acceptable or unacceptable according to said analysis result information; and a control unit for moving one of said printhead and said recording material relative to a remaining one thereof at a small adjusting shifted amount in said first scan direction, said adjusting shifted amount being equal to a pitch between an unacceptable nozzle of which said unacceptable state is judged and an acceptable nozzle close thereto and of which said acceptable state is judged among said ejection nozzles, said control unit causing said acceptable nozzle to eject said ink instead of said unacceptable nozzle, so as to compensate for lowering of image quality due to said unacceptable state based on whether an object which prevents said liquid from passing through a discharging port of said ejection nozzle is stuck on said election nozzle.

11. The liquid ejection inspector of claim 10, wherein the pickup device photographs ejection nozzle orifices in said ejection nozzle array.

12. An image forming apparatus comprising:

at least one ejection nozzle array including plural ejection nozzles comprising a printhead for ejecting liquid, wherein said plural ejection nozzles extend in a first scan direction;

a pickup device for photographing said ejection nozzles in said ejection nozzle array, to output image data, wherein said image data is recorded to recording material;

an analyzer for storing reference image data, and for outputting analysis result information according to said image data and said reference image data; and a determining unit for judging whether an ejecting state of said ejection nozzles is acceptable or unacceptable according to said analysis result information; and a control unit for moving one of said printhead and said recording material relative to a remaining one thereof at a small adjusting shifted amount in said first scan direction, said adjusting shifted amount being equal to a pitch between an unacceptable nozzle of which said unacceptable state is judged and an acceptable nozzle close thereto and of which said acceptable state is judged among said ejection nozzles, said control unit causing said acceptable nozzle to eject said ink instead of said unacceptable nozzle so as to compensate for lowering of image quality due to said unacceptable state based on whether an object which prevents said liquid from passing through a discharging port of said ejection nozzle is stuck on said election nozzle.

13. An image forming apparatus as defined in claim 12, further comprising a foreign material elimination unit for eliminating foreign material from said ejection nozzles.

14. An image forming apparatus as defined in claim 13, wherein said reference image data is used in a pattern recognition process, and said analyzer and said determining unit cooperate to judge one of acceptable and unacceptable states of said ejection nozzles by evaluating said image data in said pattern recognition process.

15. An image forming apparatus as defined in claim 14, wherein said elimination unit is operated at least when said unacceptable state is judged according to said analysis result information.

16. An image forming apparatus as defined in claim 14, wherein according to said analysis result information, said elimination unit is selectively operated for unacceptable ejection nozzles included in said ejection nozzles and of which said unacceptable state is judged.

17. An image forming apparatus as defined in claim 14, wherein said analyzer further calculates a blocked area where said foreign material blocks said ejection nozzles according to said image data;

further comprising a control unit for changing a driving parameter of said elimination unit according to said blocked area.

18. An image forming apparatus as defined in claim 17, wherein said elimination unit is a suction unit for sucking said liquid out of said ejection nozzles, and said driving parameter is at least one of a pressure of suction of said suction unit, a length of time of said suction, and a number of times of said suction.

19. An image forming apparatus as defined in claim 14, further comprising an image history memory for storing image history data constituted by plural sets of image data obtained previously;

wherein said analyzer judges whether said image data is within a range of said image history data, and if said image data is within said range of said image history data, determines said acceptable stale of an ejection nozzle corresponding to said image data, and if said image data is outside said range of said image history data, determines an ejection nozzle corresponding to said image data as a failure-expected nozzle, and processes said image data for said failure-expected nozzle, to output said analysis result information.

20. An image forming apparatus as defined in claim 19, wherein said pickup device photographs said failure-expected nozzle when operated again.

21. An image forming apparatus as defined in claim 14, wherein said analyzer determines a difference between said image data and said reference image data, said difference constituting said analysis result information;

said determining unit stores information of a predetermined threshold value adapted to said pattern recognition process, compares said difference with said threshold value, judges said acceptable state if said difference is equal to or less than said threshold value, and judges said unacceptable state if said difference is more than said threshold value.

22. An image forming apparatus as defined in claim 14, wherein said pickup device comprises a CCD or CMOS.

23. The image forming apparatus of claim 12, wherein the pickup device photographs ejection nozzle orifices in said ejection nozzle array.

24. An image forming apparatus comprising:

at least one ejection nozzle array including plural ejection nozzles comprising a printhead for ejecting liquid, wherein said plural ejection nozzles extend in a first scan direction;

a foreign material elimination unit for eliminating foreign material from said ejection nozzles;

a pickup device for photographing said ejection nozzles in said ejection nozzle array, to output image data, wherein said image data is recorded to recording material;

an analyzer for storing reference image data, and for outputting analysis result information according to said image data and said reference image data; and a determining unit for judging whether an ejecting state of said ejection nozzles is acceptable or unacceptable according to said analysis result information; and a control unit for moving one of said printhead and said recording material relative to a remaining one thereof at a small adjusting shifted amount in said first scan direction, said adjusting shifted amount being equal to a pitch between an unacceptable nozzle of which said unacceptable state is judged and an acceptable nozzle close thereto and of which said acceptable state is judged among said ejection nozzles, said control unit causing said acceptable nozzle to eject said ink instead of said unacceptable nozzle, so as to compensate for lowering of image quality due to said unacceptable state, wherein said reference image data is used in a pattern recognition process, and said analyzer and said determining unit cooperate to judge one of acceptable and unacceptable states of said ejection nozzles by evaluating said image data in said pattern recognition process.

25. An image forming apparatus as defined in claim 24, further comprising a mode selector for setting a selected one of an elimination mode and a nozzle substitution mode, and for, when said elimination mode is set, operating said elimination unit, and for, when said nozzle substitution mode is set, causing said control unit to operate said acceptable nozzle included in said ejection nozzles for substitution.

26. An image forming apparatus as defined in claim 24, further comprising a carriage for moving said printhead relative to said recording material in a second scan direction;

said pickup device is arranged beside a printing surface of said recording material in said second scan direction, and is opposed to said printhead moved by said carriage.

27. An image forming apparatus comprising:

at least one ejection nozzle array including plural ejection nozzles for ejecting liquid;

a pickup device for photographing said ejection nozzles in said ejection nozzle array, to output image data;

an analyzer for storing reference image data, and for outputting analysis result information according to said image data and said reference image data; and a determining unit for judging whether an ejecting state of said ejection nozzles is acceptable or unacceptable according to said analysis result information; and a control unit for moving one of said ejection nozzle array and said recording material relative to a remaining one thereof at a small adjusting shifted amount in said first scan direction, said adjusting shifted amount being equal to a pitch between an unacceptable nozzle of which said unacceptable state is judged among said ejection nozzles and an acceptable nozzle close thereto and of which said acceptable state is judged among said ejection nozzles, said control unit causing said acceptable nozzle to eject said liquid instead of said unacceptable nozzle, so as to compensate for lowering of image quality due to said unacceptable state, wherein said liquid is ink, and said ejection nozzle array comprises a printhead of an ink jet type adapted to image recording to recording material and extending in a first scan direction.

* * * * *